United States Patent [19]

Underwood

[11] 4,339,406
[45] Jul. 13, 1982

[54] PROCESS OF FORMING A NOZZLE

[75] Inventor: Gene E. Underwood, Casper, Wyo.

[73] Assignee: 3U Partners, Casper, Wyo.

[21] Appl. No.: 189,216

[22] Filed: Sep. 22, 1980

Related U.S. Application Data

[62] Division of Ser. No. 15,292, Feb. 26, 1979, Pat. No. 4,241,878.

[51] Int. Cl.$^3$ .................. B29D 1/00; B29D 3/00; B29C 1/14
[52] U.S. Cl. .................................. 264/154; 264/267; 264/274
[58] Field of Search ............... 264/154, 267, 269, 274; 239/589, 591, 602; 222/95

[56] References Cited

U.S. PATENT DOCUMENTS

| | | | |
|---|---|---|---|
| 3,185,512 | 5/1965 | Kilgore | 239/602 |
| 3,612,409 | 10/1971 | Henning | 239/602 |
| 3,633,467 | 1/1972 | Watanabe | 264/269 |
| 3,692,243 | 9/1972 | Breunsbach | 239/602 |
| 3,938,709 | 2/1976 | Collar | 222/95 |
| 4,168,033 | 9/1979 | von Bernuth et al. | 239/591 |
| 4,184,638 | 1/1980 | Ogasawara et al. | 239/589 |

FOREIGN PATENT DOCUMENTS

| | | | |
|---|---|---|---|
| 910479 | 6/1946 | France | 239/591 |
| 2307641 | 12/1976 | France | 264/274 |

Primary Examiner—James B. Lowe
Attorney, Agent, or Firm—Arthur F. Zobal

[57] ABSTRACT

A process of forming a nozzle for discharging a fluid comprising locating in an upright position, a tubular conduit having internal threads formed on the inside thereof at opposite ends. A core having a conical shaped end is located within the conduit such that it extends out of the conduit, and is spaced from the inside wall of the conduit down to the threads at the lower end of the conduit. The conical shaped end of the core and the conduit are surrounded with a mold having its inside wall spaced from the conical shaped end of the core. The space between the inside wall of the conduit and the core is filled with a liquid material. The liquid material is allowed to harden to form an elastic member molded within the conduit. The mold and core are removed and a portion of the elastic member extending beyond the conduit is severed to form a discharge opening.

4 Claims, 4 Drawing Figures

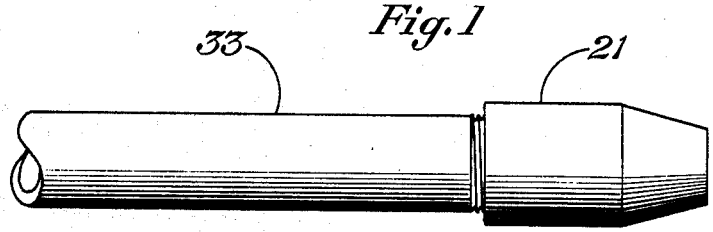
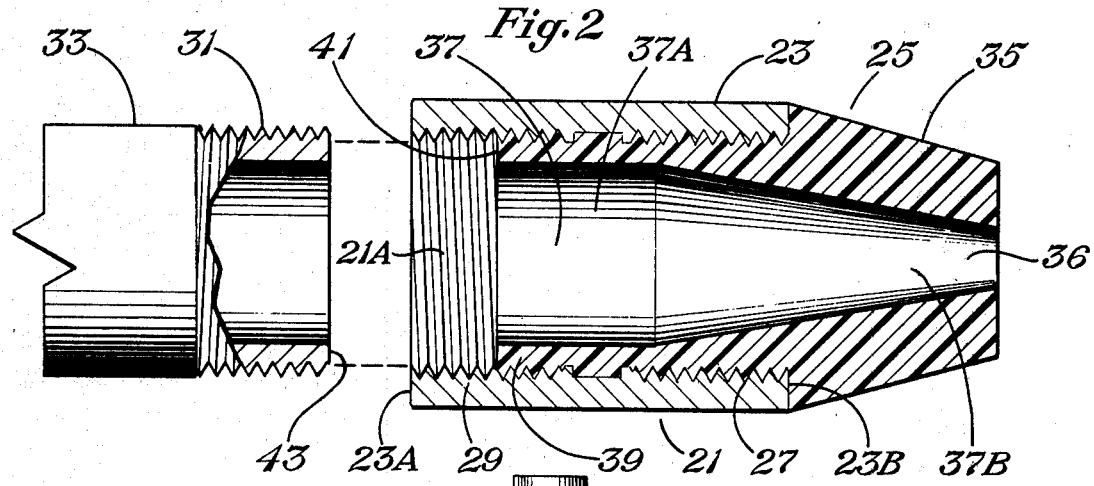
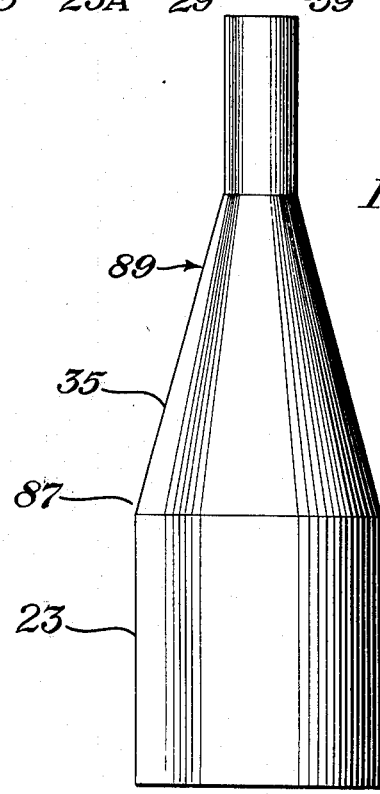

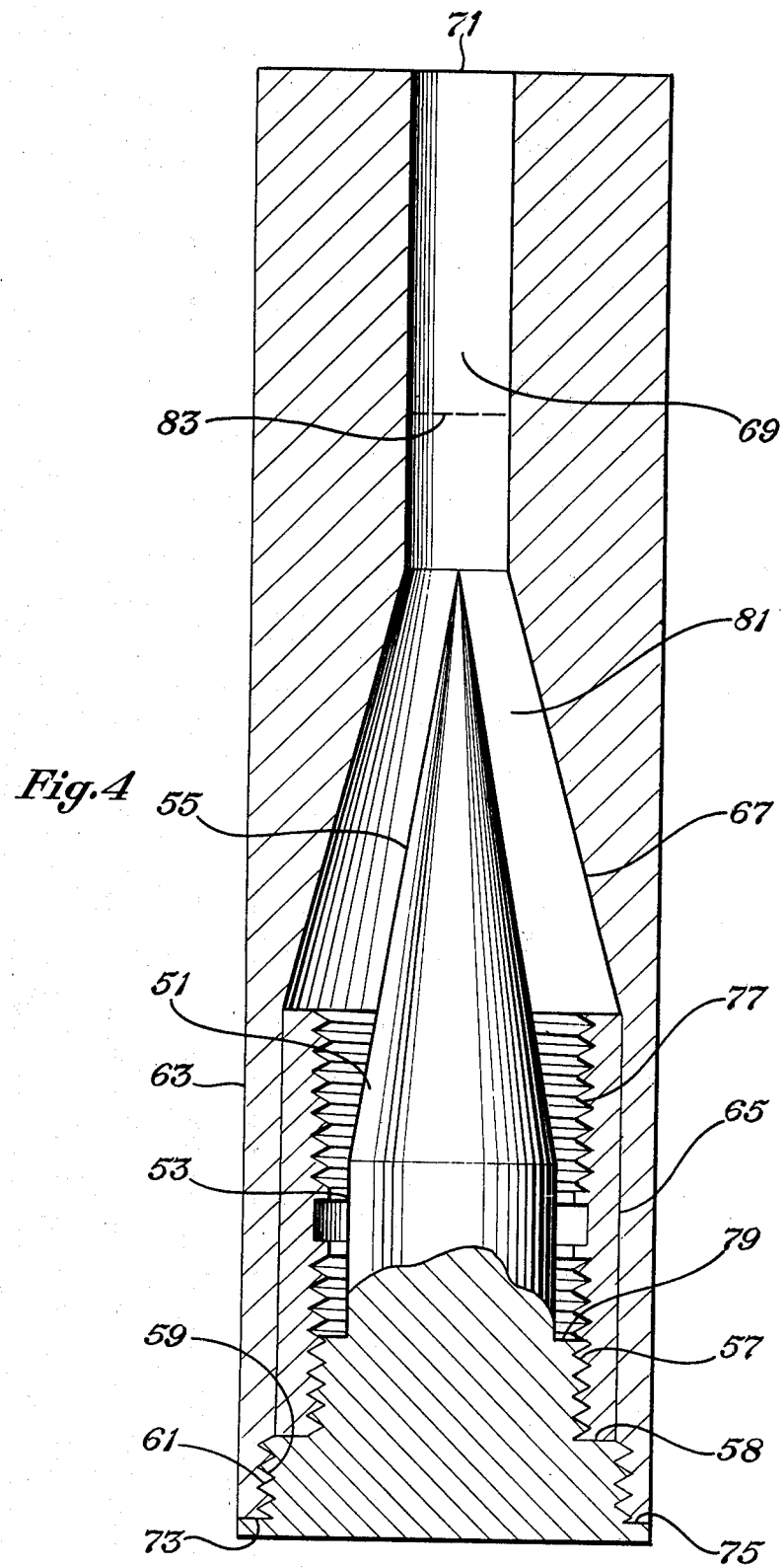

PROCESS OF FORMING A NOZZLE

This application is a division, of application Ser. No. 015,292, filed Feb. 26, 1979 now U.S. Pat. No. 4,241,878.

BACKGROUND OF THE INVENTION

1. Field of the Invention

The present invention relates to a nozzle or more particularly to a nozzle for use for discharging abrasive fluids.

2. Description of the Prior Art

In the oil field or drilling industry, expensive steel nozzles are used for mixing drilling fluid. In most cases, the drilling fluid is highly abrasive which results in a very short life for the steel nozzles. Thus, a need exists for a longer wearing less expensive nozzle.

SUMMARY OF THE INVENTION

It is an object of the present invention to provide a longer wearing less expensive nozzle than those heretofore known to the invention.

It is another object of the present invention to provide a nozzle which comprises an elastic member molded into a conduit.

It is a further object of the present invention to provide an unique process of forming a nozzle.

BRIEF DESCRIPTION OF THE DRAWINGS

FIG. 1 is a side view of the nozzle of the present invention threaded to the end of a pipe.

FIG. 2 is a cross sectional view of the nozzle of FIG. 1 detached from the pipe.

FIG. 3 is a side view of the blank from which the nozzle of FIG. 2 is formed.

FIG. 4 illustrates the mold for forming the blank of FIG. 3.

DESCRIPTION OF THE PREFERRED EMBODIMENTS

Referring now to FIGS. 1 and 2, the nozzle of the present invention is identified by reference numeral 21. It comprises a threaded metal pipe coupling or conduit 23 having an elastic member 25 molded therein. The coupling 23 has oppositely disposed threads 27 and 29 formed on the inside at opposite ends thereof. By "oppositely disposed" is meant that when viewing the nozzle from one of its ends, one set of threads are formed in a clockwise direction and the other set formed in a counter clockwise direction. The elastic member 25 embeds all of the threads 27 at the down stream end and a portion of the threads 29 at the up stream end, leaving the remaining portion of the threads 29 exposed to be threaded to mating male threads 31 formed on conduit or pipe 33. The elastic member 25 has a discharge end 35 extending out of the conduit 23. An aperture 37 extends through the member 25 from its up stream end 39 to its discharge or down stream end 35. The aperture 37 comprises a cylindrical shaped portion 37A and a conical shaped portion 37B at its discharge end.

In use, the threads 29 of nozzle 21 are threaded to the threads 31 of pipe 33 and fluid is injected from pipe 33 through the nozzle 21 for the purposes desired. The inside diameter of the up stream end 39 of the elastic member 25 is the same as the inside diameter of pipe 33 whereby the inside surface of the end 39 of member 25 is flush with the inside surface of pipe 33. When the nozzle 21 is threaded to pipe 33, end surface 41 of member 25 will be engaged by end surface 43 of pipe 33 and be compressed to form a seal between the two end surfaces. The pressure provided by the working fluid flowing through the nozzle also will compress the elastic member against the nozzle conduit 23 and will result in additional sealing force between end surfaces 41 and 43.

As indicated above, the threads 27 and 29 are oppositely disposed. Since the elastic member 25 embeds threads 27 and a portion of threads 29, the elastic member is locked in place and cannot be dislodged either by unthreading or by the force of the fluid injected through the nozzle.

The elastic member 25 is formed of a highly abrasive resistant elastomer which preferably is a polyurethane. Such material has much better wearing qualities to abrasive fluids than does steel. It is has been found that the present nozzle having its elastic member 25 formed of polyurethane or other highly abrasive resistance elastomers will last much longer than a steel nozzle when employed for use for mixing abrasive drilling fluids. The inside surface of member 25 has a very smooth finish which provides a high coefficient of discharge. Moreover, the nozzle 21 is formed of inexpensive materials and is simple to construct and hence is less expensive than a steel nozzle.

Referring also to FIGS. 3 and 4, there will be described the method of producing the nozzle 21. In the construction process, a core 51 is used having a lower cylindrical portion 53 and an upper conical shaped portion 55 which defines the shape of the aperture 37. The core 51 has upper threads 57 which mate with threads 29 of the nozzle conduit 23; a lower shoulder 58 for engaging the lower end 23A of the conduit 23 and in addition lower threads 59 which mate with threads 61 of the mold 63. The mold 63 has a lower inner cylindrical surface 65 for receiving the conduit 23; an upper conical shaped inner surface 67 adapted to receive the conical end 55 of the core 51; and a small upper cylindrical shaped aperture 69 leading to an upper opening 71. In operation, threads 57 of core 51 are threaded into threads 29 of the conduit 23 until shoulder 58 engages the lower end of nozzle conduit 23. The mold 63 is fitted around the conduit 23 with the core 51 in place and threads 61 threaded to threads 59 of core 51 until the lower end 73 of mold 63 abuts against shoulder 75 of core 51.

In the position of the core and mold shown in FIG. 4, an annulus 77 is formed between the inside of the conduit 23 and the core surfaces 53 and 55 down to the lower level defined by shoulder 79 of core 51 which forms the bottom of the annulus. It is noted that the shoulder or bottom 79 as shown in FIG. 4 is located between the upper and lower ends of upstream threads 29 of conduit 23. An annulus 81 also is formed between the inside surface 67 of the mold 63 and the conical shaped end 55 of the core. Although not shown, a fitting having a small central opening is inserted in opening 71 through which liquid polyurethane is poured to obtain a stream smaller in diameter than aperture 69 and concentric with the walls of aperture 69. The fitting has air passages formed between its outer wall and the inner wall of aperture 69. The small stream of liquid polyurethane flows as a film downward and around core 53. When the film reaches shoulder 79 the annulus 77 is filled from the bottom up displacing air. As the liquid level reaches annulus 81, it also is filled from the bottom up, displacing air. When the liquid reaches a level indicated by dotted line 83, the flow of polyurethane is stopped. In the process, no air is trapped in the polyurethane thereby preventing the formation of air bubbles in the resulting elastic member 25. The mold then is placed in an oven for curing purposes. After the polyurethane has partially cured, the core 51 is unthreaded from the conduit 23 and from mold 63 to obtain the blank 87 shown in FIG. 3. It has the threaded upstream opening 21A and aperture 37 extending upward from end surface 41 to the position where the point of cone 55 extends conforming to the shape of the core 51. The blank is placed in the oven for final curing. After final curing, the top portion of the blank is severed at a position desired, for example, at 89, as shown in FIG. 3 to form the discharge opening 36 of the nozzle. If a larger opening is desired, the blank will be severed at a lower position. It could even be severed at the end 23B of conduit 23.

As indicated above, the polyurethane embeds threads 27 and a portion of the oppositely disposed threads 29 which together act to lock the elastic member in place. If desired, circumferential ribs could be formed on the inside of conduit 23 in lieu of threads 27 for locking purposes. It is to be understood that other types of locking means may be used. In addition, the conduit 23 may have other forms, for example, it could be a T-shaped member with its right angle opening plugged.

In one embodiment, the nozzle 21 may be used for the nozzles employed in the fluid mixing system described and claimed in my co-pending U.S. Patent application Ser. No. 810,590, filed June 27, 1977 now U.S. Pat. No. 4,170,420.

In order to form a nozzle for blasting purposes, the shape of the core 51 used in the process will have a cylindrical section 53, a conical shaped portion conforming with the shape of a portion of cone 55, a smaller cylindrical shaped portion terminating in a cone tip. The purpose of the cone tip is to form the liquid polyurethane film around the core as it is poured. After curing and removal of the core and mold, the blank will be severed at level of the resulting smaller cylindrical shaped portion of the aperture whereby the aperture formed through the elastic member will have a shape similar to the exterior shape of the blank of FIG. 3.

What is claimed is:

1. A process of forming a nozzle for discharging a fluid; comprising the steps of:
   locating in an upright position a tubular conduit having an opening formed therethrough and having internal threads formed on the inside thereof at opposite ends,
   said internal threads formed on the inside of said conduit at said opposite ends being threaded in opposite directions respectively,
   locating within said conduit a core having a conical shaped end extending upward and out of said conduit,
   said core being spaced inward from the inside wall of said conduit down to a lower level between the upper and lower ends of said internal threads at the lower end of said conduit,
   surrounding said conical shaped end of said core with a mold having its inside wall spaced from said conical shaped end,
   filling the space between the inside wall of said conduit and the core with a liquid material starting with said lower level and extending upward to the top of said conduit,
   filling the space between said conical shaped end of said core and the inside wall of said mold with said liquid material up to a level above the top of said core,
   said liquid material being characterized such that when it hardens it becomes elastic,
   allowing said liquid material to harden to form an elastic member molded within said conduit,
   removing said mold and said core, and
   severing a portion of said elastic member extending beyond said conduit to form a discharge opening for the aperture extending into said elastic member formed upon removal of said core.

2. A process of forming a nozzle for discharging a fluid, comprising the steps of:
   locating in an upright position a tubular conduit having an opening formed therethrough and having internal threads formed at its lower end and internal locking means formed on the inside above said threads,
   locating within said conduit a core having a conical shaped end extending upward and out of said conduit,
   said core being spaced inward from the inside wall of said conduit down to a lower level between the upper and lower ends of said internal threads at the lower end of said conduit,
   surrounding said conical shaped end of said core with a mold having its inside wall spaced from said conical shaped end,
   filling the space between the inside wall of said conduit and the core with a liquid material starting with said lower level and extending upward to the top of said conduit,
   filling the space between said conical shaped end of said core and the inside wall of said mold with said liquid material up to a level above the top end of said core,
   said liquid material being characterized such that when it hardens it becomes elastic,
   allowing said liquid material to harden to form an elastic member molded within said conduit,
   removing said mold and said core, and
   severing a portion of said elastic member extending beyond said conduit to form a discharge opening for the aperture extending into said elastic member formed upon removal of said core.

3. The process of claims 1 or 2, wherein:
   said core has a lower end with outer threads adapted to be threaded to said internal threads formed at said lower end of said conduit,
   the upper end of said outer threads of said core terminating in an annular surface which extends inward from the upper end of said outer threads of said core to a smaller cross-sectional portion of said core,
   said core being located within said conduit by inserting said conical shaped end of said core through said conduit by way of said lower end of said conduit and threading said outer threads of said core to said internal threads of said lower end of said conduit to position said annular surface of said core between the upper and lower ends of the threads formed at said lower end of said conduit.

4. The process of claims 1 or 2, wherein:

said core has a lower end with outer threads adapted to be threaded to said internal threads formed at said lower end of said conduit, the upper end of said outer threads of said core terminating in a flat annular surface generally perpendicular to the axis of said core and which extends inward from the upper end of said outer threads of said core to a smaller cross-sectional portion of said core, said core being located within said conduit by inserting said conical shaped end of said core through said conduit by way of said lower end of said conduit and threading said outer threads of said core to said internal threads at said lower and of said conduit to position said annular surface of said core between the upper and lower ends of the threads formed at said lower end of said conduit.

* * * * *